United States Patent
Shpilyuck et al.

(10) Patent No.: US 11,411,819 B2
(45) Date of Patent: Aug. 9, 2022

(54) AUTOMATIC NETWORK CONFIGURATION IN DATA PROTECTION OPERATIONS

(71) Applicant: EMC IP Holding Company LLC, Hopkinton, MA (US)

(72) Inventors: Boris Shpilyuck, Ashdod (IL); Assaf Natanzon, Tel Aviv (IL); David Zlotnick, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 139 days.

(21) Appl. No.: 16/249,965

(22) Filed: Jan. 17, 2019

(65) Prior Publication Data

US 2020/0235993 A1     Jul. 23, 2020

(51) Int. Cl.

| | |
|---|---|
| *G06F 15/177* | (2006.01) |
| *H04L 41/08* | (2022.01) |
| *G06F 11/20* | (2006.01) |
| *G06F 9/455* | (2018.01) |
| *H04L 41/0806* | (2022.01) |
| *H04L 41/12* | (2022.01) |
| *H04L 61/5007* | (2022.01) |
| *H04L 43/08* | (2022.01) |
| *H04L 12/46* | (2006.01) |

(52) U.S. Cl.
CPC ...... *H04L 41/0876* (2013.01); *G06F 9/45558* (2013.01); *G06F 11/2023* (2013.01); *H04L 12/4641* (2013.01); *H04L 41/0806* (2013.01); *H04L 41/12* (2013.01); *H04L 43/08* (2013.01); *H04L 61/2007* (2013.01); *G06F 2009/45595* (2013.01); *G06F 2201/815* (2013.01); *G06F 2201/82* (2013.01)

(58) Field of Classification Search
CPC ... H04L 12/4641; H04L 41/12; G06F 11/2023
USPC .......................................................... 709/222
See application file for complete search history.

(56) References Cited

U.S. PATENT DOCUMENTS

| | | | |
|---|---|---|---|
| 9,450,823 B2 * | 9/2016 | Arora ...................... | H04L 41/20 |
| 9,594,640 B1 * | 3/2017 | Chheda ................ | G06F 11/1448 |
| 2007/0223493 A1 * | 9/2007 | Sridhar ............... | H04L 12/4679 370/395.53 |
| 2008/0016115 A1 * | 1/2008 | Bahl ....................... | H04L 41/22 |
| 2011/0264786 A1 * | 10/2011 | Kedem ................ | G06F 9/45558 709/223 |
| 2011/0299424 A1 * | 12/2011 | Rikitake ............. | H04L 12/4625 370/254 |
| 2012/0084406 A1 * | 4/2012 | Kumbalimutt ...... | H04L 12/4641 709/220 |
| 2013/0159864 A1 * | 6/2013 | Smith ..................... | H04L 43/50 715/734 |
| 2015/0341221 A1 * | 11/2015 | Vatnikov ............. | G06F 11/2097 718/1 |

(Continued)

*Primary Examiner* — Hee Soo Kim
(74) *Attorney, Agent, or Firm* — Workman Nydegger

(57) ABSTRACT

Automatic network configuration for the recovery of virtual machines. A network configuration can be automatically provisioned by discovering the network topology of a source site and then matching the virtual machines to their locations or subnets in the network topology. The network is then implemented on a target site such that the required connectivity is present in the recovered target site even when the infrastructure of the source site and the target site are different.

11 Claims, 4 Drawing Sheets

(56) References Cited

U.S. PATENT DOCUMENTS

| | | | |
|---|---|---|---|
| 2016/0048408 A1* | 2/2016 | Madhu | G06F 11/2023 718/1 |
| 2016/0077919 A1* | 3/2016 | Duggan | G06F 11/1484 714/15 |
| 2016/0359872 A1* | 12/2016 | Yadav | H04L 63/1408 |
| 2017/0005923 A1* | 1/2017 | Babakian | G06F 9/45558 |
| 2017/0262300 A1* | 9/2017 | Brandwine | H04L 29/06877 |
| 2019/0372835 A1* | 12/2019 | Featonby | H04L 41/0806 |

* cited by examiner

AUTOMATIC NETWORK CONFIGURATION IN DATA PROTECTION OPERATIONS

FIELD OF THE INVENTION

Embodiments of the present invention relate to systems and methods for protecting data. More particularly, embodiments of the invention relate to systems, methods and apparatus for performing recovery operations including the automatically recovering a network configuration for virtual machines.

BACKGROUND

Today, most entities and organizations use computer technologies when conducting operations. There are times, however, when problems arise with their computers and networks. As a result, sensible organizations plan for potential problems by implementing systems that recovery their computing systems.

A sensible plan includes the ability to perform recovery operations including disaster recovery operations. In fact, a recovery operation is a critical process for organizations and is required to guarantee business continuity. One of the most challenging steps in recovering a computing system, particularly one that includes virtual machines, is recovering the network configuration. Part of the difficulty stems from the fact that the network infrastructure on the target site may be fundamentally different from the network infrastructure on the production or source site. This complicates the recovery process, particularly from a network point of view.

These problems are magnified for a large site that incudes multiple subnets and hundreds of virtual machines. If the network configuration is not set up correctly during a recovery operation, the system will fail and result at least in connectivity errors between the virtual machines. Troubleshooting and resolving these issues is a time-consuming and complex manual process.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
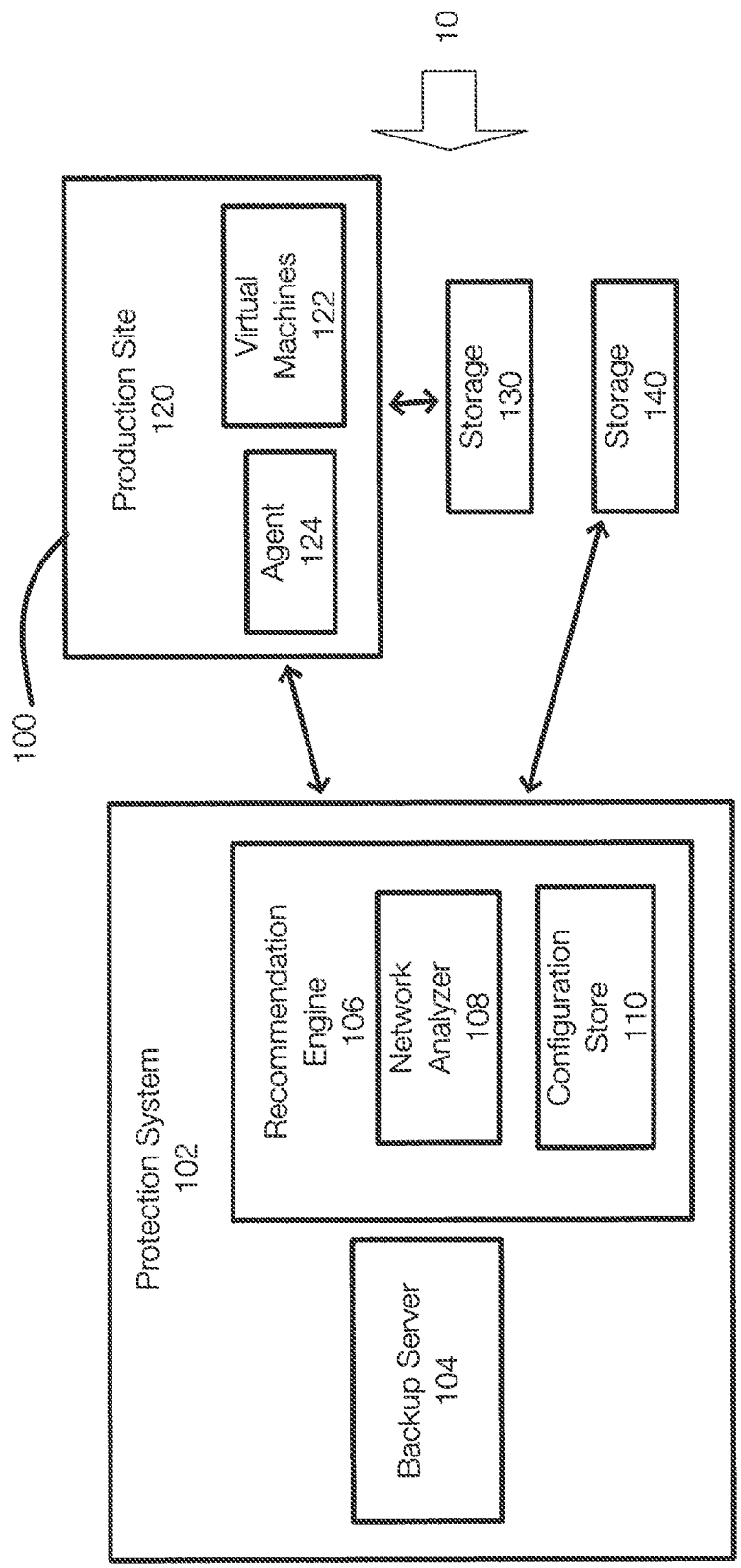
FIG. 1 illustrates an example of a protection system configured to perform recovery operations for or on a computing environment such as a source site.

Embodiments of the invention relate to a systems, methods and apparatus for performing data protection operations. Examples of data protection operations include, but are not limited to, backup operations, recovery operations, deduplication operations, replication operations, boot configuration operations, automatic network configuration, disaster recovery or the like or combination thereof. Embodiments of the invention further relate to systems and methods for automatically performing recovery operations and in particular to automatically configuring a network for recovering virtual machines.

Recovery operations, such as recovery operations and disaster recovery operations, include many steps such as selecting a suitable recovery point, configuring the boot order of the virtual machines and configuring the network and networking systems for the virtual machines. The ability to automatically configure the networking improves the operation of the recovery operation and thus the operation of the computing system, ensures that the recovered system operates with fewer errors and the like. In addition, the ability to properly configure the network on the target site saves effort, money and time for the user. Further, the process of planning the recovery plan and executing the recovery plan for an environment of virtual machines is improved. Embodiments of the invention automate the network configuration process on the recovery site.

Embodiments of the invention consider the networking topology of a source site and create a similar topology at the recovery or target site. In this process, the network configuration of the source site (e.g., subnets, address ranges, routes) is determined as part of generating a recovery plan. Part of the recovery plan may include identifying relationships between the virtual machines and the subnets and identifying communication routes within the network topology. The recovery plan can be executed during a recovery operation to create the same or a sufficiently similar networking topology at the target site. This may include creating subsets with the same address ranges and the same routes between subnets. The virtual machines being restored can be restored or matched to the correct subnets.

Embodiments of the invention further allow the recovery to be implemented across different infrastructures. For example, the recovery plan can account for differences between the source site and the target site (e.g., on premise network vs. cloud network, different hypervisors, or traditional networks vs. software defined networks (SDN)).

In one example, the networking topology of a source site can include a significant amount or number of subnets, subnet address ranges, routes and virtual machines. Virtual machines that need to communicate with each other should be placed in or to the subnets that have routes that allow communication during the recovery operation.

Embodiments of the invention automate networking configuration for recovery operations including disaster recovery operations. This will make configuring recovery operations easier, will save time for the customers and will prevent errors that are hard to discover and troubleshoot, especially when planning and executing discovery operations between sites with different network infrastructure or when recovering to the cloud, when mapping of the network configuration between the sites is non-trivial.

Embodiments of the invention further improve the operation of the recovery operation and of the resulting network system at least because, conventionally, networking communication errors are often discovered only at the last stage of a recovery plan—after all of the virtual machines have been launched. As a result, fixing and resolving network errors may require undoing previous steps or manually performing the reconfigurations. In addition, these errors are difficult to find and troubleshoot and often require the resources of support, which incurs cost in terms of money and time and may interfere with business continuity. Embodiments of the invention reduce these concerns by ensuring that the network topology at the target site is properly configured or less likely to experience problems.

Embodiments of the invention thus relate to systems and methods for recovering a computing system that includes, in one embodiment, virtual machines. Embodiments of the invention create a recovery plan that includes the correct networking topology and virtual machine matching. The recovery plan, when executed, automatically creates the networking topology at the target sit and matches the virtual machines being recovered or launched to the correct subnets in the target site.

In one example, the data protection system may include a recommendation engine that generates a recovery plan. The recovery plan may include a method for recovering a recovery a network topology at a target site, selecting a restore point, determining a boot order for the virtual machines, or the like or combination thereof.

FIG. 1 illustrates an example of a computing environment or system 10. The computing system 10 may be implemented in a local network, a cloud based network, or the like. FIG. 1 illustrates a protection system 102 configured to provide data protection services (e.g., backup operations, recovery operations, etc.) to the production site 120. In this example, the production site 120 includes virtual machines 122.

The virtual machines 122 may be arranged according to a network topology that may include subnets, address ranges and routes. Data may be stored at the production site 120 or in a storage 130. The storage 130 may be local or remote storage and may include cloud based storage.

The protection system 102 may include a backup server 104 that is configured to control the various data protection operations. For example, backup data may be stored in the storage 140 (e.g., local storage, data domain, cloud based storage, or the like). The storage 140 and the storage 130 can be the same system or different systems.

The protection system may also include a recommendation engine 106 that is configured to generate recommendations such as a recovery plan for recovering the production site 110. The recommendation engine 106 may generate the recovery plan using a network analyzer 108 that may collect or determine a network topology of the production site 120 and of how the virtual machines 122 are configured. The network analyzer 108 may communicate with an agent 124 (or agents) that operate in the production site 120 and that may be resident on one or more of the virtual machines 122. Alternatively, an agent may have its own IP address within the production site 120.

The recommendation engine 106 is configured to discovery a network topology of the production site 120. The network topology may be defined, by way of example and not limitation, by subnets, address ranges, and routes. The recommendation engine 108 is also configured to analyze the network traffic (e.g., by sniffing, intercepting or reading packets on the network) in order to discover all of the virtual machines 122 in the production site 120. This allows virtual machines that initiate communications and that receive communications to be identified. This allows each of the virtual machines 122 to be mapped or matched to specific subnets. In addition, this allows a map to be generated that maps the connectivity or routes between the virtual machines. Once the network is discovered, a user may be provided with a textual or visual representation of the recovery plan at least with respect to the network topology. In addition, embodiments of the invention may perform translations such that the terms match the target environment or system. For example, the term VLAN may be translated to subnet based on the network infrastructure and capabilities of the target site.

Figure 2:
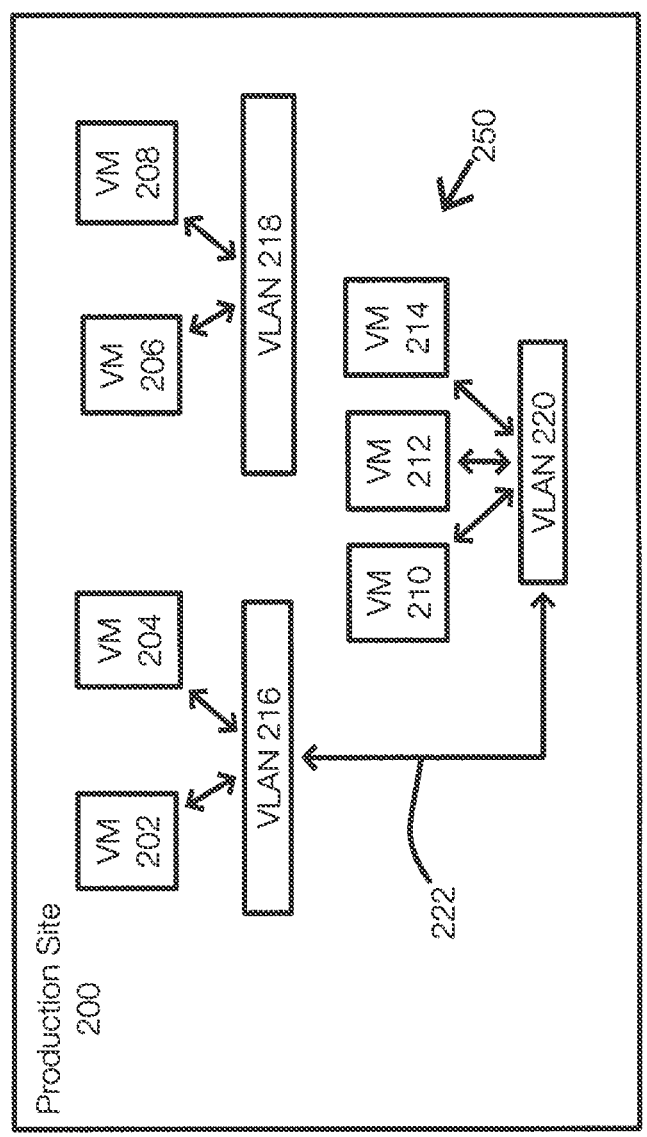
FIG. 2 illustrates an example of a network of a production site that is analyzed in order to prepare a recovery plan.

FIG. 2 illustrates an example of a source or production site 200 that is protected by a data protection system. The site 200 includes or hosts multiple virtual machines (VMs) represented by VM 202, 204, 206, 208, 210, 212 and 214. VMs 202 and 204 are associated with VLAN 216, VMs 206 and 208 are associated with VLAN 218, and VMs 210, 212, 214 are associated with VLAN 220. A VLAN typically allows a set or a plurality of VMs to be organized into a virtual network or subnet based on reasons that may be independent of the physical network. At the same time, these virtual machines may also be associated with a subrange of IP addresses. While analyzing the network communications, these IP addresses can be identified such that the corresponding VLANs or subnets can be determined.

FIG. 2 illustrates a route 222, which allows communications between the VMs in the VLAN 216 and the VMs in the VLAN 220. VLANs, in one example, allow different logical and physical networks to be created. The routes such as route 222 enable communication between VMs in different subnets or VLANs. Stated differently, a route such as the route 222 guides networking protocol. VLANs can be used to establish rules or protocols that determine how different groups can communicate. Routes facilitate networking communication. For example, a route may indicate that all addresses 10.1.x.x should be forward to another subnet or VLAN for handing. Routes are an example of configuration information that allow or that direct a network how to reach a destination.

A subnet and/or VLAN, in one example, is a division of a network. Each subnet or VLAN may be assigned or associated with a specific range of addresses such as IP addresses.

Embodiments of the invention may discover a network topology of a network 250 associated with the production site 200. This may include identifying subnets, address ranges and routes included in the network 250.

Figure 3:
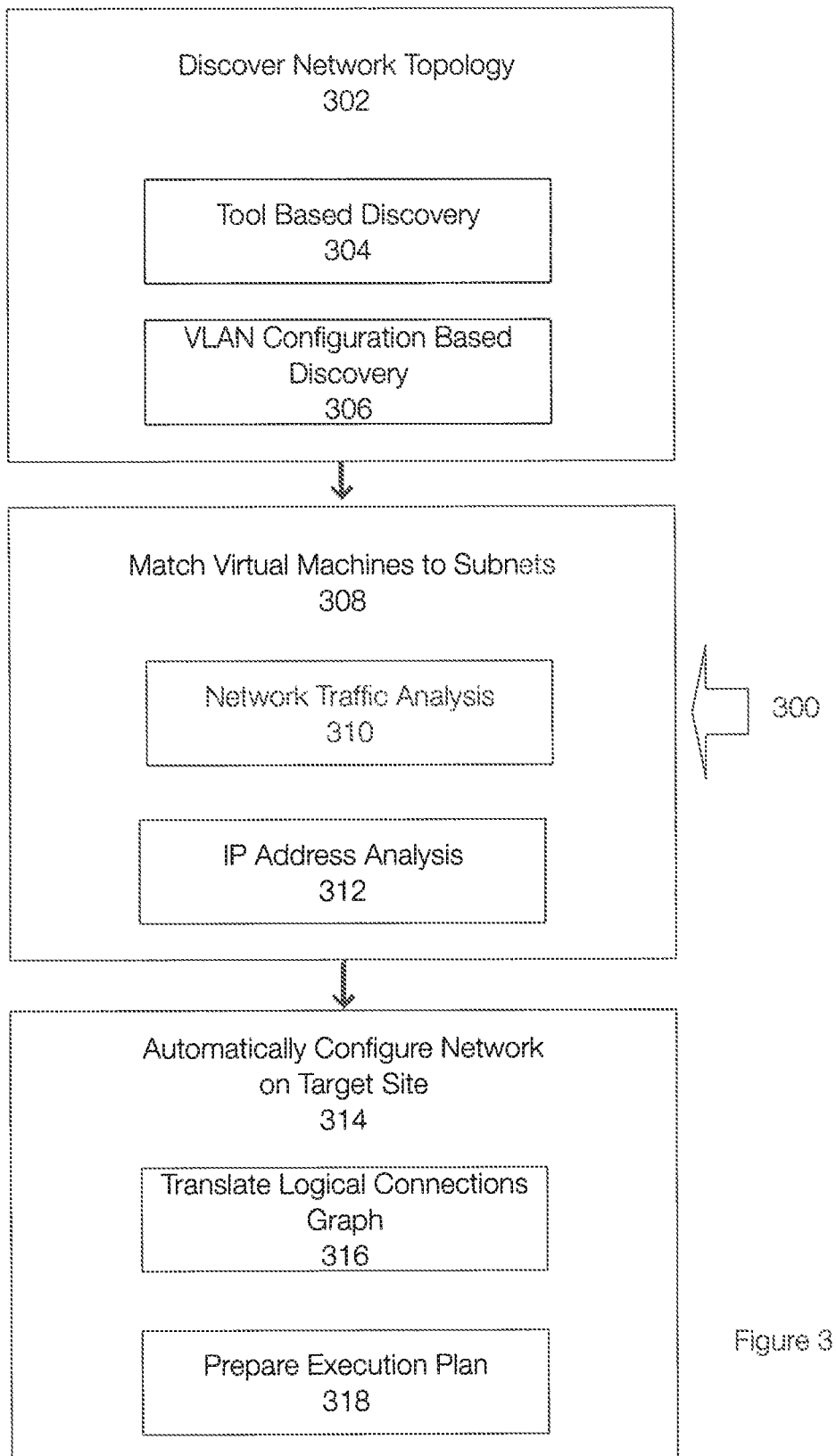
FIG. 3 illustrates an example of a method for generating a recovery plan and a method for executing or implementing the recovery plan.

FIG. 3 illustrates an example of a method for generating a recovery plan and/or implementing the recovery plan. The method 300 may begin by discovering 302 a network topology. This may be performed by a recommendation engine or a network analyzer. For example, a network topology can be detected based on information that can be gathered from network discovery protocols, such as RIP or OSPF. These protocols allow the subnets, IP address ranges associated with the subnets, and routes within the network to be discovered and stored.

In another example, the network topology can be discovered based on virtual machine VLAN configurations 306. Application Programming Interfaces (APIs) of a hypervisor, for example, can be queried or administrative agents on the VMs themselves can be used to acquire the VLAN configurations. In one example, tool based discovery 304 and VLAN configuration based discovery 306 may generate the same information. However, VLAN configuration based discovery 306 is a programmatic way to discovery the network topology 302.

After discovering 302 the network topology, the recommendation engine has an understanding of a network's subnets (or VLANs), IP addresses and ranges and how the various subnets are connected (e.g., routes). More specifically, the information gathered from discovering 302 the network topology allows IP address to be identified and organized. For example, all IP addresses in the range of 10.0.x.x may be a identified as a first subnet while IP addresses in the range of 10.1.x.x may be identified as another subnet.

The method 300 may then match 308 the virtual machines in the network to the discovered network topology. For example, the virtual machines may be matched or mapped to the identifies subnets. This allows the protection system to understand or associate the VMs in the network to their specific subnets. In one example, this is achieved by performing a network traffic analysis 310. By sniffing or otherwise evaluating the network traffic or by intercepting and analyzing packets in the network, information about the IP addresses of the virtual machines can be determined. For example, the packets on the network can be used to identify source VMs and destination VMs and their IP addresses for network communications. This allows the VMs to be matched to the appropriate subnets.

Performing network analysis allows all of the virtual machines in the network to be discovered and allows all of the IP addresses of those virtual machines to be determined and matched to the network topology.

Once the IP addresses of the virtual machines in the network are determined, an IP address analysis 312 can be performed as previously indicated. In one example, the IP addresses are analyzed and specific VMs can be associated to specific subnets or VLANs.

In one example, matching 308 virtual machines to subnets allows a mapping of the desired connectivity between the virtual machines. This allows, for example, routes to be identified in a recovery plan and implemented during a recovery operation. For example, when the virtual machines are mapped to subnets, the analysis may determine that a virtual machine in a first subnet communicates with a virtual machine in a second subnet. As a result, this allows a route to be established between these two virtual machines and/or between these two subnets. Thus, the recovered network topology is configured such that these VMs can communicate.

Once the network topology is known and the virtual machines are matched to subnets, a recovery plan can be generated and approved or simply implemented if desired. In one example, the protection system may generate information that can be presented to the user or that represents a logical connection graph illustrating how the production site maps or will be restored to a target site.

Figure 4:
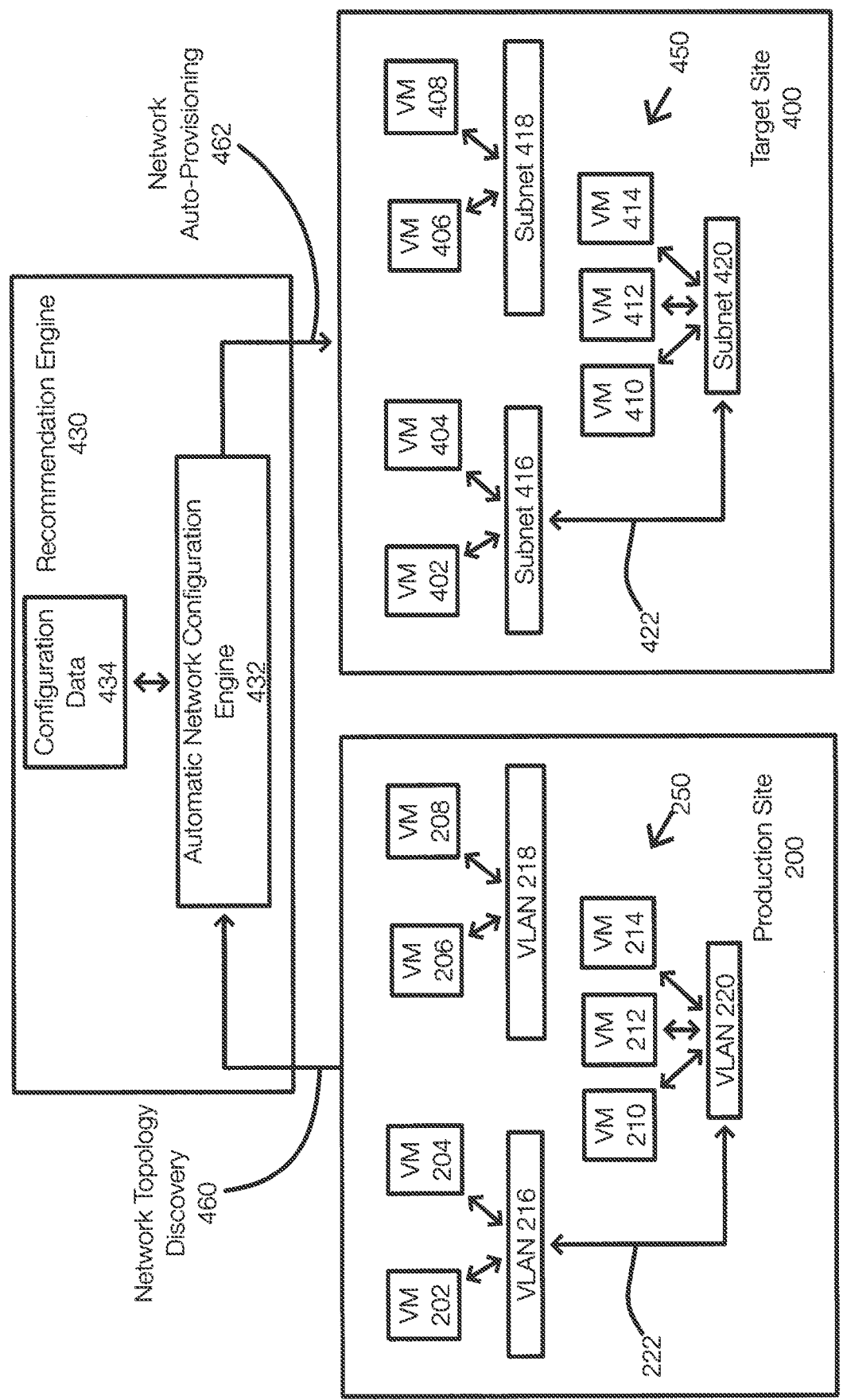
FIG. 4 graphically illustrates a method for generating and/or implementing a recovery plan.

FIG. 4 illustrates an example of presenting the recovery plan and/or a method for implementing a recovery plan. The data protection system may include a recommendation engine 430 that produces a recovery plan or a disaster recovery plan. The recommendation engine 430 may include an automatic network configuration engine 432 (engine 432) that is configured to perform network topology discovery 460. The engine 432 may also be configured to perform network auto provisioning 462. Information gathered or obtained by the engine 432 may be stored as network configuration data 434. The network configuration data 434 can be updated periodically, in response to changes in the network 250 (addition/removal of virtual machines, new code, upgrades, or the like).

The engine 432 may discover the topology of the network 250 associated with the production site 200. If the production site is distributed, the engine may configure each site separately. Using network topology discovery protocol like RIP or OSP, the engine 432 will detect the network topology including subnets or VLANs such as VLANs 216, 218, and 220, address ranges for each of the VLANs or subnets and routes within the network 250 such as route 250.

Based on virtual machines VLAN configuration or on the discovered network topology of the network 250, the virtual machines VLAN configuration is analyzed in order to get information about subnets, address ranges and routes. This can be done using Hypervisor APIs (e.g. vCenter), or using administrative agents on the VMs themselves (e.g. VM Tools).

The engine 432 may also match VMS to the correct subnets. For example, a network traffic analysis (connections between sources and targets) allows the engine 432 to discover all the virtual machines in the site 200 and the IP addresses of the virtual machines can be obtained. Based on the network topology previously determined and the IP addresses obtained, each VM can be matched to a specific subnet.

By analyzing the IP addresses in the recovery plan and the subnet information, a logical mapping of the desired connectivity between virtual machines can be determined.

Next, the engine 432 may translate the network topology and VM subset information to a target site or to the equivalent network objects on the target site 400. Thus, the recovery plan may translate the network configuration of the network 250 (which may be stored in the configuration data 434) to the network 450 of the target site 450.

In this example, the VMs 202 and 204 of the VLAN 216 are mapped to VMs 402 and 404, which are part of a subnet 416. The VMs 206 and 208 in the VLAN 218 are mapped to the VMs 406 and 408 in a subnet 418. The VMs 210k, 212 and 214 of the VLAN 220 are mapped to the VM 410, 412 and 414 of the subnet 420.

More specifically, the engine 432, when autoprovisioning the network 250, may create subnets 416, 418 and 420 and insure that the VMs are placed therein. In addition, the network 450 is configured with routs such as the route 422 such that, as necessary, VMs in different subnets can communicate as they communicated at the source site 200.

The engine 432 thus prepares a recovery plan to autoprovision the required network infrastructure on the target site 400. This ensures that the connectivity between the relevant VMs at the target site 400 is the same as or similar to the connectivity on the production site 200.

FIG. 4 illustrates an example of a plan that could be presented to a user for approval. FIG. 4 graphically illustrates how the production site 200 would be recovered at the target site 400. If necessary, the user may be able to make changes to the recovery plan. Optimally, no changes or manual intervention is needed.

Finally, FIG. 4 can also illustrate, in addition to the generation of a recovery plan, the implementation or the recovery plan. During implementation or a recovery operation, the recovery plan is performed to construct the network 450 at the appropriate point of the recovery operation.

As shown in FIG. 4, some of the terms may be translated to account for the infrastructure. For example, VLAN is translated to subnet. In this case, adjustments may be made to the configuration to account for the specifics of the VLAN if necessary. Similarly, routes may be adapted to ensure the required connectivity.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a recovery plan to automatically provision a network at a target site, the method comprising:
    discovering a network topology of a network of a source site programmatically using queries and based on network topology discovery protocols, wherein discovering the network topology programmatically includes querying a hypervisor of virtual machines operating in the network topology, wherein the queries and the network topology discovery protocols allow subnets, Internet Protocol addresses associated with each of the subnets, and routes within the network to be identified;
    matching each of the virtual machine to the network topology based on the analysis to create a mapping of each of the virtual machines to the discovered network topology including to the identified subnets by performing a network analysis which includes sniffing network traffic at the source site, to identify IP addresses for each of the plurality of virtual machines at the source site;
    determining which virtual machines communicate with which virtual machines based on the network analysis, wherein the network analysis analyzes packets to identify source virtual machines and destination virtual machines based on the associated IP addresses of the source virtual machines and the destination virtual machines;
    analyzing the IP addresses and the subnets to include logical connections between virtual machines in the mapping, wherein the logical connections include routes from a virtual machine in a first subnet to a virtual machine in a second subnet;
    preparing the recovery plan to auto-provision a network of the target site such that a connectivity of the target site is equivalent to a connectivity of the network of the source site, wherein the recovery plan, during implementation, is configured to construct the network at the target site to correspond to the network associated with a recovery point, wherein preparing the recovery plan includes translating the logical connections to equivalent network objects at the target site; and
    presenting a logical connection graph illustrating how the production site is restored to the target site.

2. The method of claim 1, further comprising discovering the network topology based on VLAN configurations, wherein the VLAN configurations are determined using APIs or agents.

3. The method of claim 1, wherein matching each of the plurality of virtual machines to the network topology, the method further comprising matching each of the plurality of virtual machines to specific subnets.

4. The method of claim 1, further comprising presenting the recovery plan to user for approval or for changes.

5. The method of claim 1, further comprising recovering the network of the target site in accordance with the recovery plan.

6. The method of claim 1, further comprising translating portions of the recovery plan to account for differences in infrastructure between the source site and the target site.

7. A non-transitory computer readable medium comprising computer executable instructions to implement operations for a method for generating a recovery plan to automatically provision a network at a target site, the method comprising:

discovering a network topology of a network of a source site programmatically using queries and based on network topology discovery protocols, wherein discovering the network topology programmatically includes querying a hypervisor of virtual machines operating in the network topology, wherein the queries and the network topology discovery protocols allow subnets, Internet Protocol addresses associated with each of the subnets, and routes within the network to be identified;

matching each of the virtual machines to the network topology based on the analysis to create a mapping of each of the virtual machines to the discovered network topology including to the identified subnets by performing a network analysis which includes sniffing network traffic at the source site, to identify IP addresses for each of the plurality of virtual machines at the source site;

determining which virtual machines communicate with which virtual machines based on the network analysis, wherein the network analysis analyzes packets to identify source virtual machines and destination virtual machines based on the associated IP addresses of the source virtual machines and the destination virtual machines;

analyzing the IP addresses and the subnets to include logical connections between virtual machines in the mapping, wherein the logical connections include routes from a virtual machine in a first subnet to a virtual machine in a second subnet;

preparing the recovery plan to auto-provision a network of the target site such that a connectivity of the target site is equivalent to a connectivity of the network of the source site, wherein the recovery plan, during implementation, is configured to construct the network at the target site to correspond to the network associated with a recovery point, wherein preparing the recovery plan includes translating the logical connections to equivalent network objects at the target site; and presenting a logical connection graph illustrating how the production site is restored to the target site.

8. The non-transitory computer readable medium of claim 7, further comprising discovering the network topology based on VLAN configurations, wherein the VLAN configurations are determined using APIs or agents.

9. The non-transitory computer readable medium of claim 7, further comprising presenting the recovery plan to user for approval or for changes.

10. The non-transitory computer readable medium of claim 7, further comprising recovering the network at the target site in accordance with the recovery plan.

11. The non-transitory computer readable medium of claim 7, further comprising translating terms in the recovery plan to account for differences in infrastructure between the source site and the target site.

* * * * *